Dec. 22, 1942.                W. T. MARCHMENT                2,305,973
ELECTRICAL LIQUID-LEVEL INDICATOR
Filed June 2, 1941                                            2 Sheets-Sheet 2
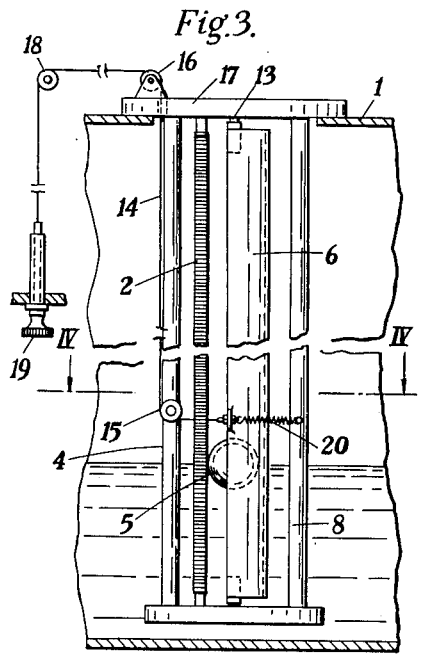
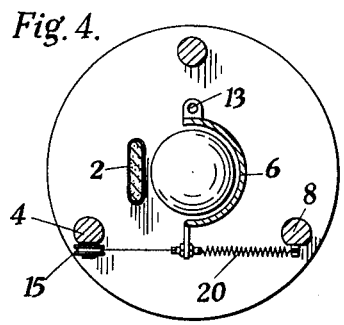
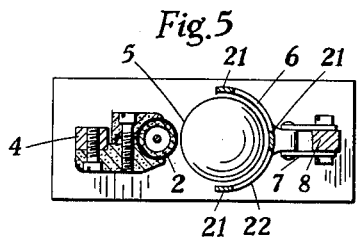
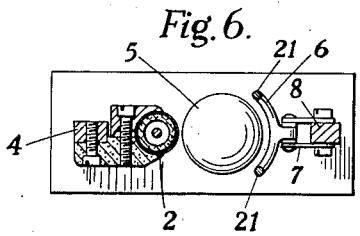
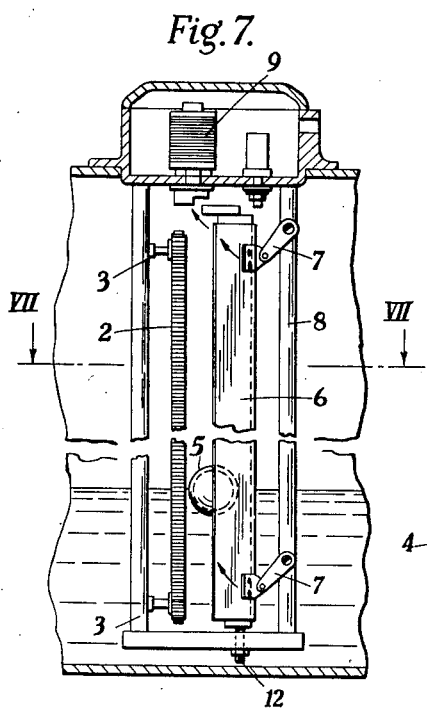
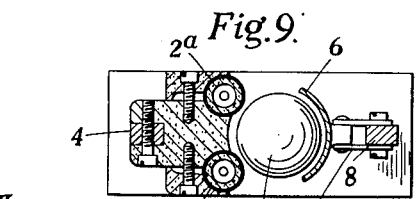
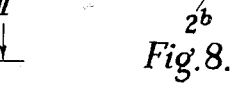
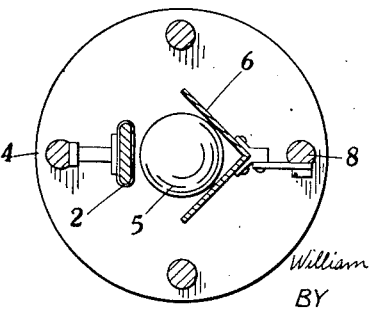
INVENTOR
William T. Marchment
BY
Ralph B. Stewart
ATTORNEY Patented Dec. 22, 1942

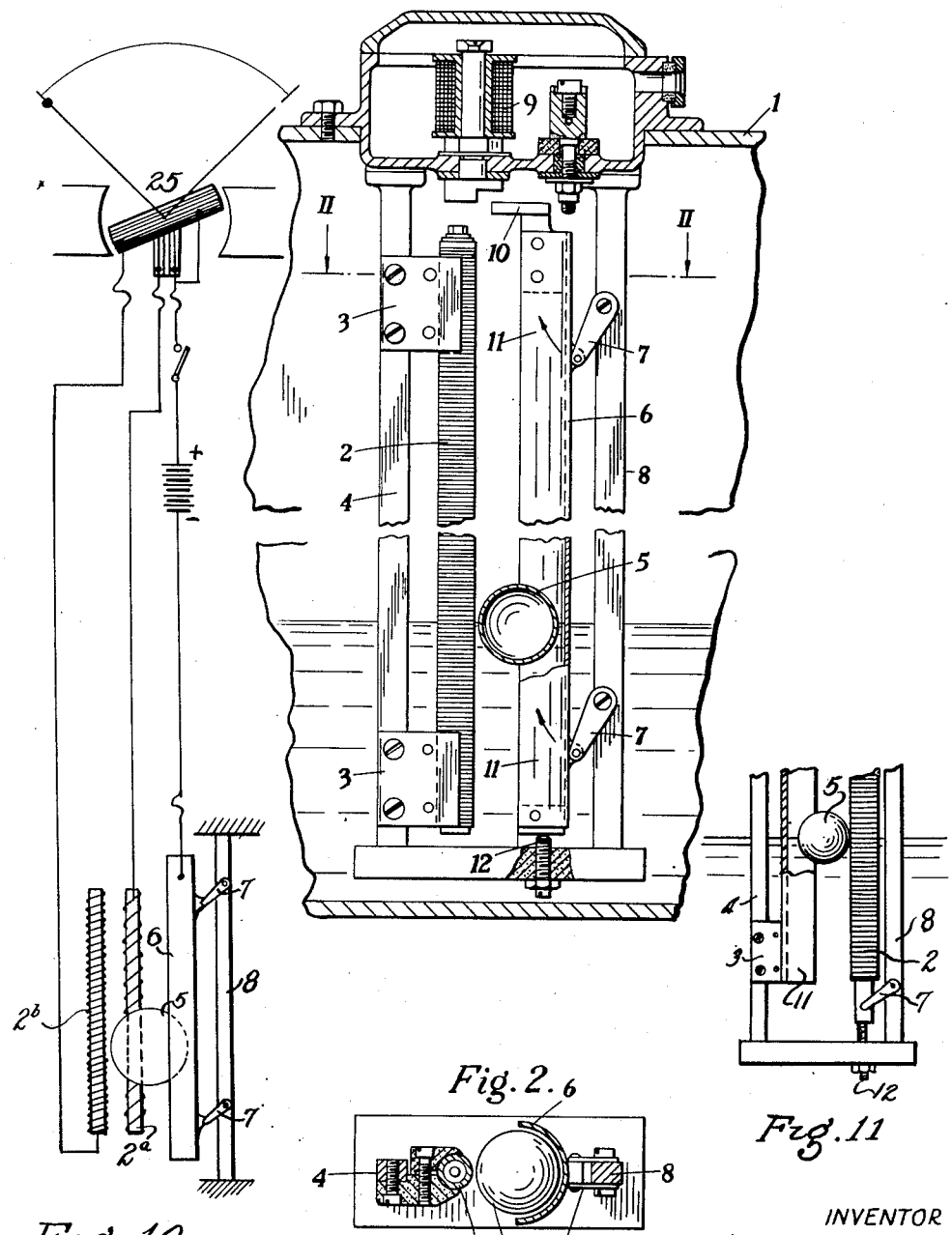

2,305,973

UNITED STATES PATENT OFFICE 2,305,973

ELECTRICAL LIQUID-LEVEL INDICATOR

William Thomas Marchment, London, England

Application June 2, 1941, Serial No. 396,357
In Great Britain July 8, 1940

6 Claims. (Cl. 73—313)

This invention relates to electrical liquid-level indicators such as are used in liquid storage tanks and particularly in the gasoline tanks of aircraft and other motor vehicles.

The invention in some aspects is a development of that forming the subject of my application Serial No. 254,940, filed February 6, 1939, now Patent No. 2,260,913. It aims at extending the application of the "free-float" principle underlying my prior invention and at providing a simplified form of apparatus. The disclosure of my said application contemplates an apparatus comprising a spherical float arranged to rise and fall freely with the liquid level within a tank, a vertical cage or guide structure to control the movement of the float between the highest and lowest liquid levels to be measured; a resistance element mounted vertically in the tank to extend along the path of the float in its rising and falling movement, and a pivoted clamping member provided for moving the float laterally across the surface of the liquid and clamping it against the resistance element when a reading is to be taken. The amount of resistance which is included by the float contact in the circuit of an indicating instrument is governed by the height of the float, and consequently by the level of the liquid so that a reading of such resistance can be calibrated in terms of the height of the liquid surface. The arrangement has, among other advantages, the great advantages that the float is entirely free and untrammelled up to the moment when it is temporarily clamped against the resistance element to take a reading, and also that the operator, on taking his reading, can observe by movement of the indicating instrument that the indicating apparatus is in working order.

Owing to the fact that except when a reading is being taken, the float is free to rise and fall and has no attachment which would increase its inertia, it is obviously necessary to retain it in the neighbourhood of the resistance element so that it can immediately be clamped against the latter when it is desired to take a reading. It is for this purpose that the guide structure was to be provided so as to permit adequate freedom of movement of the float while serving to retain it in a position in which it can quickly be caused to co-operate with the resistance element.

According to the present invention, in such an apparatus with a freely rising and falling float and a resistance element extending along the path of movement of the float between its highest and lowest positions and the clamping member referred to, the float is arranged to be guided during its rising and falling movements by means of the resistance element itself and the clamping member acting in conjunction. Thus, a guide structure separate from the resistance element and the clamping member is not required. Again, the float may conveniently be a hollow sphere composed of thin metal, or of electrical insulating material provided with a metallised surface. Although the resistance element may be moved into contact with the float, it is more practically convenient to fix the resistance element in the liquid container and to make the clamping member partially embrace the float so that even when it is moved away to give the float its freedom of rising and falling, the float is still prevented from escaping between the clamping member and the resistance element. The clamping member may be carried on parallel motion links which swing about horizontal pivots, or it may itself be mounted on a vertical pivot, in either event being drawn towards the resistance element to clamp the float by an electromagnetically-actuated mechanism or a mechanically-actuated mechanism such as a Bowden wire, while on release it is conveniently retracted by a spring to leave the float free again. Thus, the clamping member in cross-section may be semi-circular or arc-shaped, or again it may be angular or V-shaped. In order to reduce the weight of the parts, it may be in the form of a skeleton or cage, conveniently, for example, consisting of two or three vertical bars united top and bottom, and if desired at intermediate points by connecting curved pieces. It is also possible to provide more than one resistance element. There may be, for example, two parallel elements and one clamping member disposed roughly in cross-section at the angles of a triangle. Such an arrangement enables the resistances of two independent circuits to be varied simultaneously so that, for example, by suitable electrical connections, a movement of the float up or down can be caused to increase the resistance of one circuit while decreasing the resistance of the other.

Some embodiments of the present invention suitable for use with gasoline or oil tanks of aircraft will now be more fully described, reference being had to the annexed drawings, in which:

Figure 1 is an elevation partly in section of the apparatus which is fitted in the gasoline or oil tank;

Figure 2 is a section on the line II—II in Figure 1;

Figure 3 is a view similar to Figure 1 of a somewhat modified arrangement;

Figure 4 is a cross-section on the line IV—IV in Figure 3;

Figures 5 and 6 are cross-sections similar to Figure 2, showing two modified arrangements;

Figure 7 is a view similar to Figure 1; and

Figure 8 a cross-section of the line VIII—VIII in Figure 7 of yet a further modified construction; while Figure 9 is a cross-section similar to Figure 2 showing an arrangement in which there are two vertical resistance elements.

Figure 10 is a diagram illustrating one possible circuit arrangement for Figure 9.

Figure 11 is a fragmentary view showing a modification of Figure 1.

In the device shown in Figures 1 and 2, which extends between the top and bottom of a tank 1, which may be assumed to be the gasoline tank of an aeroplane, a resistance element 2 is supported by bracket plates 3 from a pillar 4 which extends between the top and bottom of the tank. The float is a spherical thin metal ball 5 shown on the surface of the liquid near to but clear from the resistance element 2. The clamping member 6 is a vertical curved plate also shown clear from the float 5 so that the latter can rise and fall freely with the liquid level. The member 6 is pivoted to parallel motion links 7 which swing about pivots on a second vertical pillar 8.

As in my Patent No. 2,260,913, the clamping member 6 is operated by an electromagnet 9 which may be connected in circuit as shown and described in the said prior patent. When it is energised, it attracts the armature 10 carried by the clamping member 6 so that the latter swings up as indicated by the arrows 11, and firmly clamps the float 5 against the resistance element 2 so that a reading can be taken. When the magnet 9 is de-energised, the clamping member 6 subsides under its own weight and rests on a stop screw 12.

In Figures 3 and 4 the arrangement is similar and similar reference numerals have been applied. In this case, however, the clamping member 6 is mounted on a vertical pivot 13 and is actuated by a Bowden wire 14 which is carried around a guide pulley 15 on a pillar 4, and a guide pulley 16 on a cover plate 17, while it may be carried round a remote pulley 18 on an instrument board where it is actuated by a pull button 19. When the button 19 is released, the clamping plate 6 is drawn back to free the float 5 by a return spring 20 anchored to the pillar 8.

In Figure 5, an arrangement similar to that in Figures 1 and 2 is illustrated, and the same reference numerals have been used. The difference is that the clamping member 6 consists of a cage or skeleton formed of three light vertical bars 21 united by webs 22 at the top and bottom, and if necessary, for the sake of stiffness, at intermediate points. In this case, as in the previous figures, it will be noted that the float 5 is of such a size that it is retained and guided conjointly by the resistance element 2 and the clamping member 6 and cannot escape through the gaps between them even when the clamping member 6 is retracted.

Figure 6 shows a slight further modification, the difference between it and Figure 5 being that the clamping member 6 in Figure 6 only comprises two vertical bars 21, and consequently the clamping member, instead of embracing an angle of about 180°, includes an angle of about 120° at the centre of the float.

In Figures 7 and 8, the clamping member 6 is of V-shaped cross-section, but the other parts including the mounting of the resistance element 2, the links 7 for the clamping member 6, and the electromagnet 9 for actuating the clamping member, are similar to those shown in Figure 1.

In Figure 9, yet a further modification is shown in which there are two resistance elements 2a and 2b mounted vertically and parallel to one another and insulated from one another. The clamping member 6 is similar to that shown in Figure 2, and when it is actuated to clamp the float 5, it is clear that the float presses against the two resistance elements 2a and 2b simultaneously. These resistances may be wound according to different laws, and the external electrical connections may be such that separate circuits connected to the two resistance elements have the resistance in one circuit increased, while that in the other is decreased, and vice-versa. This is illustrated in Figure 10 where the two resistance elements are included in the separate coil circuits of the crossed-coil measuring instrument shown in my Patent No. 2,260,913.

It will be realized that in any of the arrangements described above, a similar result may be obtained by arranging the resistance element itself to serve as the clamping member, and the clamping member to serve as a fixed abutment, the resistance element being mounted so that it can be moved to clamp the float. For example, in Figure 11 is shown a modification of Figure 1 where the resistor 2 is mounted on links 7 and the clamp 6 is fixed on brackets 3.

The resistance element may be wound on a tube of insulating material and itself may consist of wire of nickel chromium alloy insulated by an oxide coating. This enables the wire to be closely wound with adjacent turns in contact but the coating must be cleaned off along the line at which the float 5 is to be brought into contact with it. Bare or uninsulated wire may be used, but then the adjacent turns must be spaced apart. However, in some circumstances, this is an advantage since the spacing need not be entirely regular and allows for any desired law between the change in resistance and the amount of rise or fall of the float.

The latter may be hollow and made of metal or, as already indicated, it may be composed of electrical insulating material such as wood or cork furnished with a metallised surface as indicated in Fig. 11. In all cases, the float itself forms part of the circuit to the indicating or measuring instrument, of which the actual connections are exactly as disclosed in my Patent No. 2,260,913.

I claim:

1. An electrical liquid-level indicator, comprising in combination, a resistor mounted to extend between the highest and lowest liquid levels to be indicated, a clamping member mounted adjacent and parallel to said resistor, a float having an electrically-conducting surface and disposed in the space between said resistor and said clamping member so as to rise and fall freely in said space in accordance with the liquid level, and means for producing transverse relative movement between said resistor and said clamping member to hold said float in contact with said resistor when a reading is to be taken and thereby to cause said float to make electrical contact with said resistor at a point corresponding to the existing liquid level, said clamping member and said resistor being of complementary transverse sections so as to retain and guide said float during its rising and falling movements.

2. A liquid-level indicator according to claim 1 wherein said clamping member is formed of two spaced parallel portions along the length thereof for partly embracing and guiding said float in its vertical movement.

3. An electrical indicator for the level of a liquid in a container, comprising in combination, a resistor fixed in the container and extending vertically between the highest and lowest liquid levels to be indicated, a clamping member mounted to turn about a vertical axis adjacent and parallel to said resistor, a float having an electrically-conducting surface and disposed in the space between said resistor and said clamping member so as to rise and fall freely in said space in accordance with the liquid level, and means for moving said clamping member about its vertical axis towards said resistor when a reading is to be taken and thereby to cause said float to make electrical contact with said resistor at a point corresponding to the existing liquid level, said clamping member and said resistor being of complementary transverse sections so as to retain and guide said float during its rising and falling movements.

4. An electrical liquid-level indicator, comprising in combination, a resistor mounted to extend between the highest and lowest liquid levels to be indicated, a clamping member mounted adjacent and parallel to said resistor, a float having an electrically-conducting surface and disposed in the space between said resistor and said clamping member so as to rise and fall freely in said space in accordance with the liquid level, and means for producing transverse relative movement between said resistor and said clamping member to hold said float in contact with said resistor when a reading is to be taken and thereby to cause said float to make electrical contact with said resistor at a point corresponding to the existing liquid level, said clamping member being of skeleton or cage form and comprising a plurality of parallel vertical bars and said clamping member and said resistor being of complementary transverse sections so as to retain and guide said float during its rising and falling movements.

5. An electrical indicator for the level of a liquid in a container, comprising in combination, a pair of parallel, vertical wire-wound resistors fixed in proximity to one another in the container and extending between the highest and lowest liquid levels to be indicated, a clamping member mounted adjacent and parallel to said resistors and of arcuate transverse section presenting its concave face towards said resistors, a spherical float having an electrically-conducting surface and disposed in the space between said resistors and said clamping member so as to be partially embraced and retained by said clamping member while rising and falling freely in accordance with the liquid level and means for moving said clamping member towards said resistors when a reading is to be taken and therefore to cause said float to make electrical contact with said resistors at points corresponding to the existing liquid level.

6. An electrical indicator for the level of liquid in a container, comprising, in combination, a pair of vertical resistors mounted in spaced parallel relation in the container and extending between the highest and lowest liquid levels to be indicated, a clamping member mounted parallel to and substantially equidistant from said resistors, a spherical float having an electrically-conducting surface and being disposed in the space between the said spaced resistors and said clamping member, said spaced resistors and clamping member serving to guide said float while rising and falling freely in accordance with the liquid level, and means for moving said clamping member towards said resistors when a reading is to be taken, thereby causing said float to make electrical contact with said resistors at points corresponding to the existing liquid level.

WILLIAM THOMAS MARCHMENT.